(12) United States Patent
Finessi

(10) Patent No.: US 9,506,513 B2
(45) Date of Patent: Nov. 29, 2016

(54) STEEL BACK TWO-WAY SYNCHRONOUS BROACHING DEVICE AND USE METHOD THEREOF

(75) Inventor: Oscar Finessi, Guangzhou (CN)

(73) Assignee: UTIL (GUANGZHOU) AUTO PARTS CO., LTD, Guangzhou (CN)

( * ) Notice: Subject to any disclaimer, the term of this patent is extended or adjusted under 35 U.S.C. 154(b) by 118 days.

(21) Appl. No.: 13/814,663

(22) PCT Filed: May 17, 2012

(86) PCT No.: PCT/CN2012/000677
§ 371 (c)(1),
(2), (4) Date: Jun. 26, 2013

(87) PCT Pub. No.: WO2013/091274
PCT Pub. Date: Jun. 27, 2013

(65) Prior Publication Data
US 2014/0291081 A1    Oct. 2, 2014

(30) Foreign Application Priority Data

Dec. 21, 2011 (CN) .......................... 2011 1 0432900
Dec. 21, 2011 (CN) ....................... 2011 2 0541157 U

(51) Int. Cl.
| | |
|---|---|
| B23D 41/02 | (2006.01) |
| F16D 65/092 | (2006.01) |
| B23D 41/08 | (2006.01) |
| F16D 69/00 | (2006.01) |
| B21J 5/12 | (2006.01) |
| F16D 69/04 | (2006.01) |

(52) U.S. Cl.
CPC ............. *F16D 65/092* (2013.01); *B21J 5/12* (2013.01); *B23D 41/02* (2013.01); *B23D 41/08* (2013.01); *F16D 69/00* (2013.01); *F16D 2069/0491* (2013.01); *Y10T 409/400175* (2015.01)

(58) Field of Classification Search
CPC ...... B21D 22/06; B21D 22/10; B21D 22/24; B21D 24/02; B21J 5/02; B21J 5/12; B21J 9/02; B21J 9/027; B21J 9/12; B23D 41/02; B23D 41/00; B23D 41/04; B23D 41/08
See application file for complete search history.

(56) References Cited

U.S. PATENT DOCUMENTS

| | | | | |
|---|---|---|---|---|
| 1,335,908 A * | 4/1920 | Mueller | ................ | B21D 21/00 384/13 |
| 2,744,426 A * | 5/1956 | Lyon | ................... | B21D 22/201 72/354.2 |
| 3,715,906 A * | 2/1973 | Roper | ................... | B21D 53/74 445/30 |
| 4,212,185 A * | 7/1980 | Miller | ....................... | B21J 9/12 72/354.8 |
| 4,649,731 A * | 3/1987 | Eisenmann | ............... | B21J 5/02 72/352 |
| 4,985,993 A * | 1/1991 | Yagi | ..................... | B21D 53/30 29/894.353 |
| 5,694,802 A * | 12/1997 | Tanaka | ................... | B21D 15/02 72/353.6 |
| 6,457,341 B1 * | 10/2002 | Wirgarth | .................... | B21J 5/12 72/354.2 |
| 7,231,799 B2 * | 6/2007 | Schwager | ............... | B21K 1/30 72/344 |
| 2006/0053612 A1 * | 3/2006 | Babej | .................... | B21D 53/24 29/412 |

* cited by examiner

*Primary Examiner* — Edward Tolan
(74) *Attorney, Agent, or Firm* — CBM Patent Consulting, LLC

(57) ABSTRACT

The invention relates to a steel back two-way synchronous drawloom and a use method thereof. The drawloom comprises an upper die base, an upper die board, a lower die base and a lower die board, and further comprises a molded upper die and a working positioning lower die. With the adoption of a two-way synchronous broaching gear method, a gear of a product in the invention has the advantages of high density, high strength, as well as uniform and neat arrangement; furthermore, a brake pad of the product in the invention has the advantage of high shear strength. In addition, the drawloom has high production efficiency, stable whole production process, a firm gear root, and non easy falling, as well as is adaptable to be produced in mass.

7 Claims, 2 Drawing Sheets

STEEL BACK TWO-WAY SYNCHRONOUS BROACHING DEVICE AND USE METHOD THEREOF

TECHNICAL FIELD OF THE INVENTION

The invention relates to the technical field of parts and components of an automobile, particularly to a steel back two-way synchronous broaching device of a brake pad of the automobile, and a use method thereof.

TECHNICAL BACKGROUND OF THE INVENTION

A brake pad of small and medium sized automobiles generally includes a steel back and a friction block, wherein the friction block is bonded and formed by friction materials such as an enhanced material, an adhesive, a filler and so on; and the steel back bears and supports the friction block and is stamped by and made of a steel board. When the automobile is braked, the steel back is pushed by a brake clamp, and its friction block contacts a brake disk or a brake drum and friction is produced; hence the objective that the automobile is decelerated or braked will be achieved through the friction. As a brake pad is the most critical part of a brake system of the automobile and plays a decisive role in the brake effect, the glued firmness between the steel back and a friction material and the strength of the steel back are the most important factor for the brake effect.

Currently, the steel back in the market is mainly divided into three types:

a burred steel back, wherein a proprietary CNC apparatus is adopted, and the surface of the steel back is burred; the broaching grooving of this steel back is lower in density, not firm enough and easy to be fallen down; meanwhile, the production efficiency of the steel back is low, and hence the steel back cannot be produced in mass;

a counter-bore steel back, wherein a certain number of counter-holes (blind holes) is punched on the surface of the steel back; when the steel back is bonded on a friction material, the friction material will move into the counter-bore (the blind holes), so as to increase the shear strength of the brake pad; however, the counter-bore (the blind holes) influences the appearance and flatness of a product during its process; and a network locking steel back, wherein a steel mesh is directly welded on the steel back, so as to increase the shear strength between the steel back and a friction material to some extent; however, compared to the burred steel back, the shear strength of the network locking steel back is relatively low, and hence the network locking steel back can only be used within a specific range.

In WO 00/49308 A1, a brake plate and a method and an apparatus for manufacturing the brake plate are described.

The applicant has developed a steel back automatic broaching device (China invention patent CN101979200A). The broaching device can form a two-way broaching grooving on the steel back, with the advantages of fast and stable processing, a firm grooving root and high shear strength. However, as to the steel back automatic broaching device, the two-way broaching grooving shall be processed on the material of the same steel back for two times. That is, firstly, the broaching grooving in one direction shall be processed, and then the broaching grooving in the other direction shall be processed. Therefore, the processing efficiency shall yet be to be improved. Moreover, the processing method of the prior two-way broaching grooving is also easy to produce height difference, thus influencing the appearance and use performance of a product.

SUMMARY OF THE INVENTION

The objective of the invention is to provide a steel back two-way synchronous broaching device and a use method thereof. With the broaching device and the use method, the two-way broaching grooving can be molded for only one time, with the advantages of high processing efficiency, uniform height of the grooving, a firm grooving root, and no easy falling; furthermore, it is suitable for mass production and used widely.

The technical problems to be solved in the invention are realized through the following technical proposal:

A steel back two-way synchronous broaching device comprises an upper die base connected with an oil hydraulic machine, an upper die board mounted at the lower part of the upper die base, a lower die base connected with the oil hydraulic machine, and a lower die board mounted on the upper part of the lower die base in parallel, wherein the broaching device further comprises a molded upper die and a working positioning lower die; the molded upper die is mounted on the upper die board, and comprises a blade sliding board, a left blade, a right blade, a left inner slider, a right inner slider, a left outer slider and a right outer slider; the left and the right inner sliders are mounted at the lower part of the blade sliding board, symmetrically, horizontally and slidably; the left and the right blades are respectively fixed and mounted at the lower surfaces of the left and the right inner sliders; a spring is mounted between the left and the right inner sliders horizontally; the left and the right outer sliders are respectively mounted at the outer sides of the left and the right inner sliders; the working positioning lower die is mounted on the lower die board, and comprises a concave die, a product floating block and a floating spring; a working positioning type cavity is formed between the concave die and the product floating block; the pushing rod is provided at the lower part of the lower die base fixed and mounted with a left and right supporting blocks corresponding to the left and right outer sliders; and the left and the right supporting blocks are passed through and mounted on the lower die board lengthwise.

One side of the lower die base is vertically fixed and mounted with a position-limiting post.

The left and the right outer sliders as well as the left and the right inner sliders are all wedge-shaped blocks, and the lower ends of their contacting surfaces are inwards inclined.

The lower surface of the lower die board is fixed and mounted with a lower supporting board of which the bottom is fixed and mounted with the pushing rod.

The surfaces of the left and the right blades are all provided with a broaching teeth regularly distributed, of which the density is 6 broaching teeth/square millimeter.

The left and the right blades are slidably inserted and mounted together and their broaching teeth are crossly provided.

The use method of the steel back synchronous broaching device comprises the following steps:

Step 1: A raw material is placed in the working positioning type cavity between the concave die and the product floating block;

Step 2: The upper die base, driven by an oil hydraulic machine, is moved toward the lower die base;

Step 3: The left and the right blades are fitted with the raw material; the pushing rod transmits reactive force to the lower die board under the action of a nitrogen spring of the oil hydraulic machine, providing acting force in vertical direction for blade broaching teeth which are inserted into the raw material; meanwhile, the left and the right supporting blocks fixed on the lower die block execute force on the left and the right outer sliders, push them to move forwards, hence push the left and the right inner sliders to move inwards, push the left and the right blades to move inwards and horizontally, and thus form the grooving on the surface of the raw material;

Step 4: The left and the right blades continuously move deep into the surface layer of the raw material during their movement, until the upper and the lower die boards are completely closed; at this time, the depth of the left and the right blades moving into the raw material reaches a set value;

Step 5: The upper die base, driven by the oil hydraulic machine, continuously moves downwards; at this time, the left and the right blades stop executing force in the vertical direction; the left and the right supporting blocks continuously push the left and the right outer sliders to move upwards; the left and the right blades continuously move along the horizontal direction; and the grooving of the surface of the raw material, under the action of the left and the right blades, is gradually increased until it is under the limit state, and forms a two-way broaching grooving;

Step 6: The oil hydraulic machine drives the upper die base to be increased; the left and the right blades move back to the original place, and one cycle of the broaching grooving of the product is ended; and Step 7: A finished product is obtained after the broaching teeth is taken out, and the steps from Step 1 to Step 7 are continuously carried out.

The advantages and beneficial effects of the invention are as follows:

1. The broaching device adopts synchronous opposite movement for the left and the right blades to realize the synchronous processing of the blade teeth in two directions at the same time and complete the pull pattern of a product all at a once, with the advantages of higher speed and efficiency.

2. The broaching device has the advantages of easy control of the height of the grooving as a finished product, smaller height difference of the groovings in two directions, more elegant appearance, and more uniform and neat grooving arrangement. As the teeth are pulled in the left and right directions synchronously, the grooving has the advantages of higher strength, more stability, and non easy falling. A brake pad as the finished product has higher shear strength after it is processed.

3. As to the broaching device, as the grooving is processed in two directions, the lateral forces are counteracted with each other; the force, executed on the product by the broaching teeth, is decreased, so that the product size is more stable.

4. As to the broaching device, a mold has advantages of simple structure, high stability and easier maintenance.

5. As to the broaching device, the lower die of the mold is fixed, and the product is placed in the lower die, thus being easy for the product to transport feeds automatically.

6. With the adoption of a two-way synchronous broaching method, the grooving of the product has the advantages of high density, high strength, uniform and near arrangement, high shear strength of a brake pad of the product, high production efficiency, more stable whole production process, and more firm and not easy falling of a grooving root, thus being suitable for mass production.

DRAWINGS OF THE INVENTION

The figure numbers of the steel back two-way synchronous broaching device and the use method thereof are described in the followings:

1: Lower Die Base
2: Left Supporting Block
3: Lower Die Board
4: Adjusting Block
5: Upper Die Board
6: Blocking Block
7: Upper Die Base
8: Base Board
9: Left Outer Slider
10: Left Inner Slider
11: Left Blade
12: Spring
13: Blade Sliding Board
14: Blade Base Board
15: Right Inner Slider
16: Right Outer Slider
17: Position-Limiting Post
18: Right Blade
19: Right Supporting Block
20: Lower Supporting Board
21: Concave Die
22: Product Floating Block
23: Pushing Rod
24: Floating Spring
25: Pull Pattern Product

EMBODIMENTS OF THE INVENTION

With the combination of drawings, a steel back automatic broaching device and a use method thereof will be further described in the followings.

Figure 1:
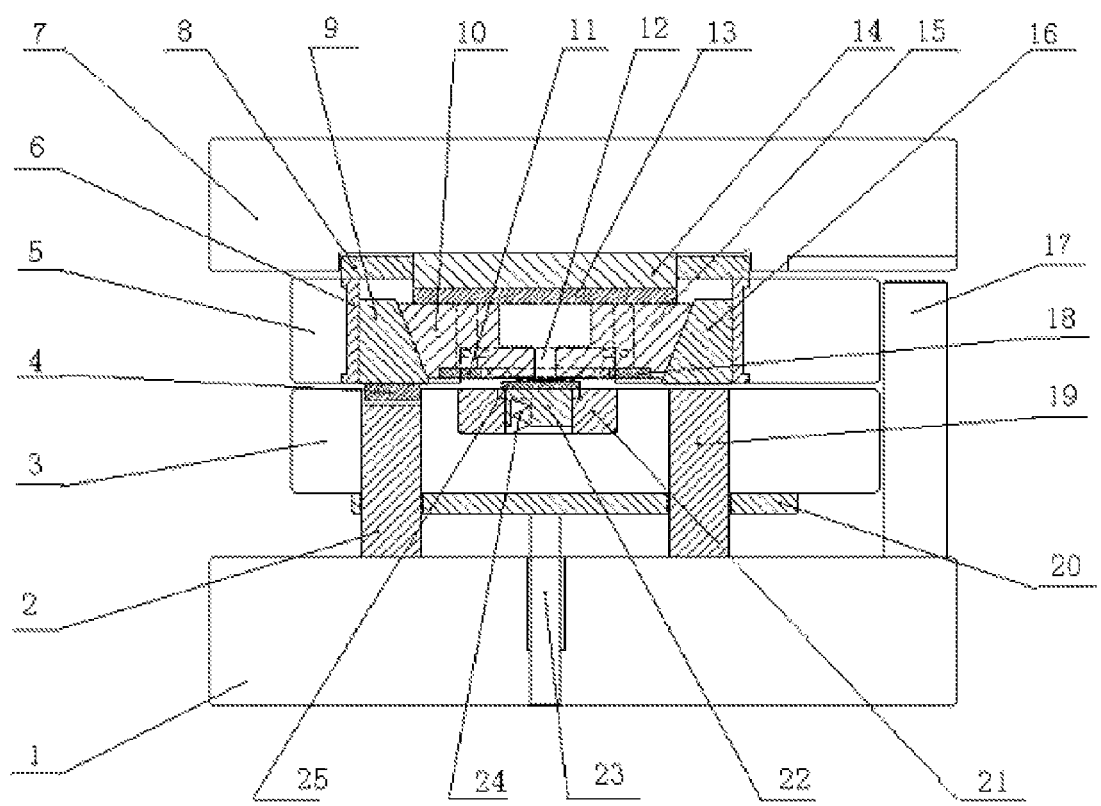
FIG. 1 is a diagram of the initial state of a steel back two-way synchronous broaching device according to the invention.
Figure 2:
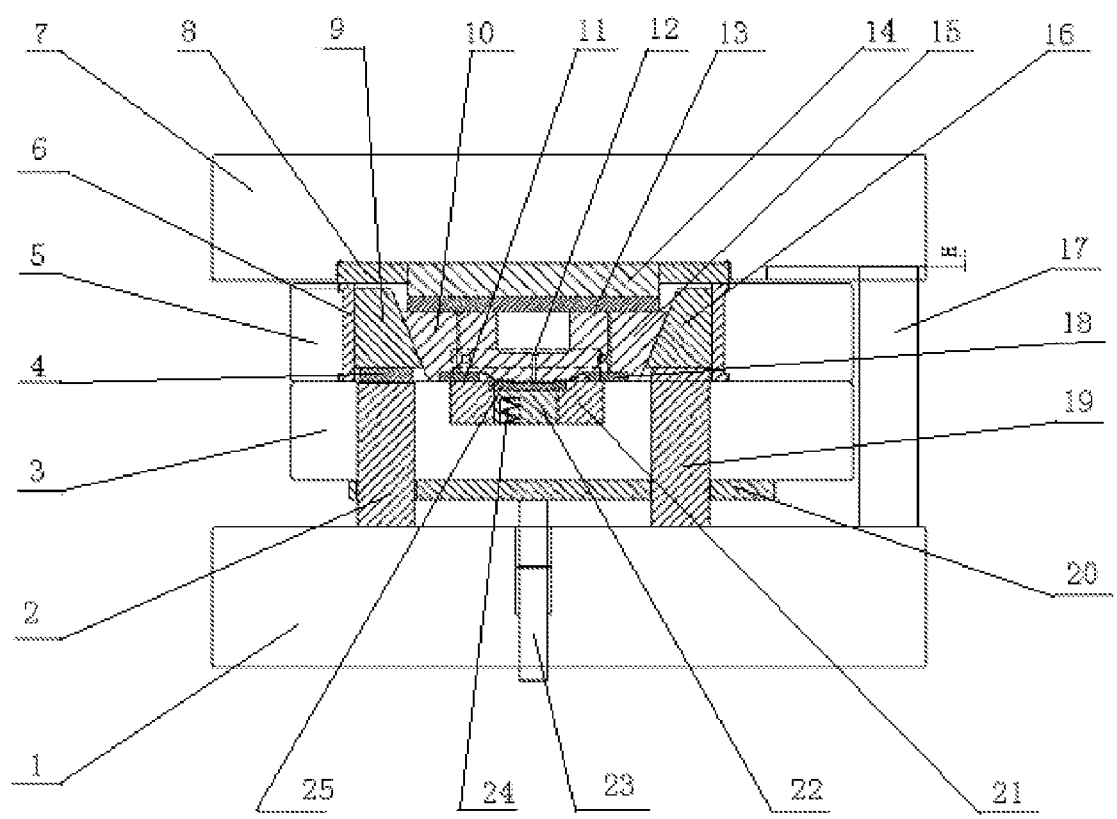
FIG. 2 is a diagram of the working state of a steel back two-way synchronous broaching device according to the invention.

As shown in FIGS. 1 and 2, a steel back two-way synchronous broaching device comprises an upper die base 7 connected with an oil hydraulic machine, an upper die board 5 mounted at the lower part of the upper die base 7, a lower die base 1 connected with the oil hydraulic machine, and a lower die board 3 mounted on the upper part of the lower die base 1 in parallel; the broaching device further comprises a molded upper die and a working positioning lower die; the molded upper die is mounted on the upper die board, and comprises a blade sliding board 13, a left blade 11, a right blade 18, a left inner slider 10, a right inner slider 15, a left outer slider 9 and a right outer slider 16; the left and the right inner sliders 10 and 15 are mounted at the lower part of the blade sliding board 13, symmetrically, horizontally and slidably; a blade base board 14 is mounted between the blade sliding board 13 and the upper die base 7; the left and the right blades are respectively fastened and mounted at the lower surfaces of the left and the right inner sliders 10 and 15; the surfaces of the left and the right blades 11 and 18 are all provided with broaching teeth regularly distributed, of which the density is 6 broaching teeth/square millimeter; the left and the right blades 11 and 18 are slidably inserted and mounted together; the broaching teeth are provided crossly; a spring 12 is mounted between the left and the right inner sliders 10 and 15 horizontally; the left and the right outer sliders 9 and 16 are respectively mounted at the outer sides of the left and the right inner sliders 10 and 15; a blocking block 6 is mounted between the outer sides of the left and the right outer sliders 9 and 16 and the upper die board 5; a base board 8 is mounted between the top of the blocking block 6 and the upper die base 7; the left and the right outer sliders 9 and 16 as well as the left and the right inner sliders 10 and 15 are all wedge-shaped blocks; the lower ends of their contacting surfaces are inwards inclined; and an adjusting block 4 is provided at the bottom of the left outer slider.

The working positioning lower die is mounted on the lower die board 3, and comprises a concave die 21, a product floating block 22 and a floating spring 24; a working positioning type cavity is formed between the concave die 21 and the product floating block 22;

The lower part of the lower die board 3 is provided with a pushing rod 23. The lower surface of the lower die board 3 is fixed and mounted with a lower supporting board 20 of which the bottom is fixed and mounted with the pushing rod 23. The lower part of the pushing rod 23 is provided with a nitrogen spring of an oil hydraulic machine.

The lower die base 1 is fixed and mounted with a left and right supporting blocks 2 and 19 corresponding to the left and the right outer sliders 9 and 16. The right supporting block 19 is passed through and mounted at the lower die board 3 lengthwise. One side of the lower die base 1 is vertically fixed and mounted with a position-limiting post 17.

The use method of the steel back synchronous broaching device comprises the following steps:

Step 1: The raw material of the pull pattern product 25 is placed in the working positioning type cavity between the concave die 21 and the product floating block 22;

Step 2: The upper die base 7, driven by the oil hydraulic machine, is moved toward the lower die base 1;

Step 3: The left and the right blades 11 and 18 are fitted with the raw material; the pushing rod 23 transmits reactive force to the lower die board 5 under the action of the nitrogen spring of the oil hydraulic machine, providing acting force in vertical direction for a blade broaching teeth which are inserted into the raw material; meanwhile, the left and the right supporting blocks 2 and 19 fixed on the lower die block execute force on the left and the right outer sliders 9 and 16, push them to move forwards, hence push the left and the right inner sliders 10 and 15 to move inwards, push the left and the right blades 11 and 18 to move inwards and horizontally, and thus form the grooving on the surface of the raw material;

Step 4: The left and the right blades 11 and 18 continuously move deep into the surface layer of the raw material during their movement, until the upper and the lower die boards 5 and 3 are completely closed; at this time, the depth of the left and the right blades moving into the raw material reaches a set value;

Step 5: The upper die base 7, driven by the oil hydraulic machine, continuously moves downwards; at this time, the left and the right blades 11 and 18 stop executing force in the vertical direction; the left and the right supporting blocks 2 and 19 continuously push the left and the right outer sliders 9 and 16 to move upwards; the left and the right blades 11 and 18 continuously move along the horizontal direction; the grooving of the surface of the raw material, under the action of the left and the right blades, is gradually increased until the position-limiting post 17 contacts the upper die base 7 (in FIG. 2, H=0); the upper die base stops moving downwards;

the height of the grooving reaches the limit state, and a two-way broaching grooving is formed;

Step 6: The oil hydraulic machine drives the upper die base 7 to be increased; the left and the right blades 11 and 18, under the action by a spring 12, move back to the original place; and one cycle of the broaching grooving of the product is ended; and Step 7: A pull pattern product is taken out, and the steps from Step 1 to Step 7 are continuously carried out.

The invention claimed is:

1. A steel back two-way synchronous broaching device, comprising an upper die base, an upper die board and a lower die base, wherein the broaching device further comprises a molded upper die and a working positioning lower die, the molded upper die comprising a blade sliding board, a left blade, a right blade, a left inner slider, a right inner slider, a left outer slider, and a right outer slider, and the working positioning lower die comprising a concave die, a product floating block and a floating spring, wherein the upper die base is connected with an oil hydraulic machine, the upper die board is mounted at the lower part of the upper die base, the lower die base is connected with the oil hydraulic machine and the lower die board is mounted on the upper part of the lower die base in parallel, wherein the molded upper die is mounted on the upper die board; wherein the left and the right inner sliders are mounted at the lower part of the blade sliding board, symmetrically, horizontally and slidably; wherein the left and the right blades are respectively fixed and mounted at the lower surfaces of the left and the right inner sliders and have surfaces provided with a plurality of broaching teeth; wherein a spring is mounted between the left and the right inner sliders horizontally; wherein the left and the right outer sliders are respectively slidably mounted at the outer sides of the left and the right inner sliders; wherein the working positioning lower die is mounted on the lower die board; wherein a working positioning type cavity is formed between the concave die and the product floating block; wherein a pushing rod is provided at the lower part of the lower die base fixed and mounted with a left and right supporting blocks corresponding to the left and right outer sliders; and wherein the left and the right supporting blocks are passed through and mounted on the lower die board lengthwise.

2. The steel back two-way synchronous broaching device according to claim 1, wherein the side of the lower die base is vertically fixed and mounted with a position-limiting post.

3. The steel back two-way synchronous broaching device according to claim 1, wherein the left and the right outer sliders as well as the left and the right inner sliders are all wedge-shaped blocks, and the lower ends of their contacting surfaces are inwards inclined.

4. The steel back two-way synchronous broaching device according to claim 1, wherein the lower surface of the lower die board is fixed and mounted with a lower supporting board, of which the bottom is fixed and mounted with the pushing rod.

5. The steel back two-way synchronous broaching device according to claim 1, wherein the surfaces of the left and the right blades have a plurality of regularly distributed broaching teeth, of which the density is 6 broaching teeth/square millimeter.

6. The steel back two-way synchronous broaching device according to claim 1, wherein the left and the right blades are slidably inserted and mounted together and their broaching teeth are crossly provided.

7. A process for operating the steel back two-way synchronous broaching device of claim 1, wherein the process comprises the following steps:
- Step 1: A raw material being placed in the working positioning type cavity between the concave die and the product floating block;
- Step 2: The upper die base, driven by an oil hydraulic machine, being moved toward the lower die base;
- Step 3: The left and the right blades being fitted with the raw material; the pushing rod transmitting reactive force to the lower die board under the action of a spring of the oil hydraulic machine, providing acting force in vertical direction for broaching teeth which are inserted into the raw material; meanwhile, the left and the right supporting blocks fixed on the lower die block execute force on the left and the right outer sliders, pushing them to move forwards, hence pushing the left and the right inner sliders to move inwards, pushing the left and the right blades to move inwards and horizontally, and thus forming a grooving on the surface of the raw material;
- Step 4: The left and the right blades continuously moving deep into the surface layer of the raw material during their movement, until the upper and the lower die boards being completely closed; at this time, the depth of the left and the right blades moving into the raw material reaching a set value;
- Step 5: The upper die base, driven by the oil hydraulic machine, continuously moving downwards; at this time, the left and the right blades stopping executing force in the vertical direction; the left and the right supporting blocks continuously pushing the left and the right outer sliders to move upwards; the left and the right blades continuously moving along the horizontal direction; and the grooving of the surface of the raw material, under the action of the left and the right blades, being gradually increased until it being under the limit state, and forming a two-way broaching grooving;
- Step 6: The oil hydraulic machine driving the upper die base to be increased; the left and the right blades moving back to the original place; and one cycle of the broaching grooving of the product being ended; and
- Step 7: A finished product being obtained after the broaching teeth are taken out, and the steps from Step 1 to Step 7 are continuously carried out.

\* \* \* \* \*